Patented June 20, 1933

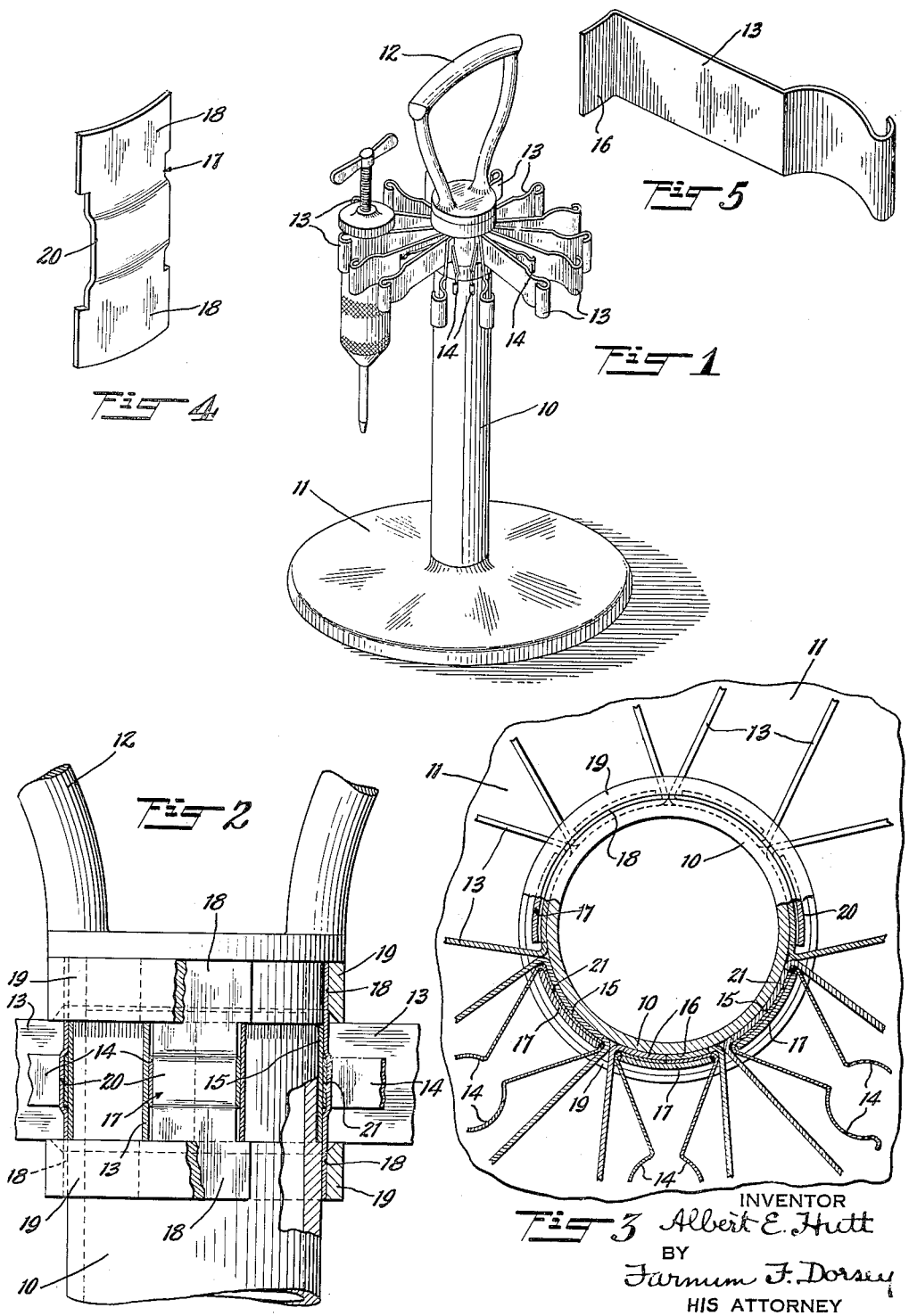

1,914,371

UNITED STATES PATENT OFFICE

ALBERT E. HUTT, OF NEW ROCHELLE, NEW YORK, ASSIGNOR TO VACUUM OIL COMPANY, INC., OF NEW YORK, N. Y., A CORPORATION OF NEW YORK

TOOL RACK

Application filed June 9, 1932. Serial No. 616,204.

This invention relates to tool racks of the kind in which a central support or upright is provided with a radiating series of clips each clip comprising a pair of arms between which a tool or implement, such as a grease gun, may be clasped and supported.

The object of the invention is to provide a simple, inexpensive and strong construction for securing the clips to the upright of a tool rack of the kind in question. To this end it is proposed to use clamp bars and binding rings, cooperating with the base members of the clips, as more particularly set forth in the following description of a preferred embodiment of the invention.

In the accompanying drawing, Fig. 1 is a perspective view of a tool rack embodying the invention. Fig. 2 is a fragmentary side elevation, with parts broken away, showing particularly the connections between the upright and the clips. Fig. 3 is a sectional plan view of the parts shown in Fig. 2. Fig. 4 is a perspective view of one of the clamp bars, and Fig. 5 is a perspective view of an arm of one of the clips.

The invention is illustrated as embodied in a rack designed particularly for supporting grease guns, one of which is shown in place in Fig. 1. The rack comprises an upright 10, preferably formed of a piece of pipe or tubing, which is fixed on a base-member 11. A handle 12 is fixed in the upper end of the upright, for use in carrying the rack from place to place. Each of the clips for holding grease guns comprises two arms 13 made of strips of spring metal and formed, at their outer ends, to embrace the body of a grease gun. Between the arms 13 of some of the larger clips, smaller clips 14 are interposed, for the purpose of receiving nozzles or tubular connectors such as are used in connection with grease guns.

Each clip arm is integral with a base portion shaped to lie against a vertical surface of the upright. Such base portion may connect two arms integrally, as shown at 15 in Fig. 3, or separate base portions 16 may be provided on the respective arms. In either case, the base portions lie in a shallow recess turned in the surface of the upright, as shown in Fig. 2, so that the clips are secured positively against vertical movement.

The clips are secured in firm engagement with the upright by clamp bars 17 formed of sheet metal and curved, in horizontal section, to fit against the outer surfaces of the base portions and against the surfaces of the upright. Each bar lies between the arms 13 of one of the clips and extends above and below the base portions, and the end portions 18 of the bars are wider than the middle portions, so that they provide shoulders adapted to engage the upper and lower edges of the clip arms and positively prevent vertical movement of the bars from their proper positions.

The parts are all locked together by two rings 19, which bind the ends of the clamp bars against the upright and the base portions. These rings are preferably secured in place by friction, being of such diameter that they make a press fit with the other parts. The necessary frictional pressure may be insured by forming the clamp bars with a curvature slightly different from the curvature of the surfaces against which they are conformed by the pressure of the rings.

To accommodate the smaller clips 14, the middle parts of the clamp bars are formed with offsets 20 of dimensions corresponding to the thickness and the width of the base portions 21 of these clips, as shown particularly in Fig. 2.

The circular form of the structure, in cross section, is not essential, and the number and shape of the clips may be varied according to requirements. While only one circle of clips is shown, it will be obvious that two or more, at different levels on the upright, may be used, and that various modifications of the illustrated structure may be made within the spirit of the invention and the scope of the annexed claims.

The invention claimed is:

1. In a tool rack or the like, the combination, with an upright, of clips comprising arms integral, at their inner ends, with base members which rest against the upright, bars crossing said base portions and extending above and below the same, and two members surrounding, respectively, the upper and lower projecting portions of the bars and cooperating with the bars to hold the clips in place.

2. In a tool rack or the like, the combination, with an upright, of clips supported by the upright and formed of strip metal bent to provide arms, projecting from the upright, and base portions resting against the upright, bars lying respectively between the arms of each clip, crossing said base members and projecting above and below the same, members surrounding the upper and lower projecting portions of said bars, respectively, and a relatively short clip, formed of relatively narrow metal and lying between the arms of one of the longer clips, the corresponding bar having a central outwardly offset portion forming a recess in which the base portion of the short clip is seated between the bar and the base portion of the longer clip.

3. In a tool rack or the like, the combination, with an upright provided with a peripheral horizontal recess, of clips projecting from the upright and having base portions seated in said recess, clamp bars crossing said base portions and having ends, projecting above and below the base portions, which are widened to overhang the clips laterally, and members surrounding the ends of the clamp bars to hold the bars in place.

4. In combination with a central support and radial members having base portions seated against said support, means, for securing said base portions in place, comprising an annular member surrounding the support, and bars, retained by the annular member, passing between the radial members and lying against said base portions thereof.

ALBERT E. HUTT.